Feb. 13, 1962 KARL-HEINZ R. GÖSCHEL ET AL 3,020,905
FUEL INJECTION SYSTEM
Filed Sept. 8, 1959
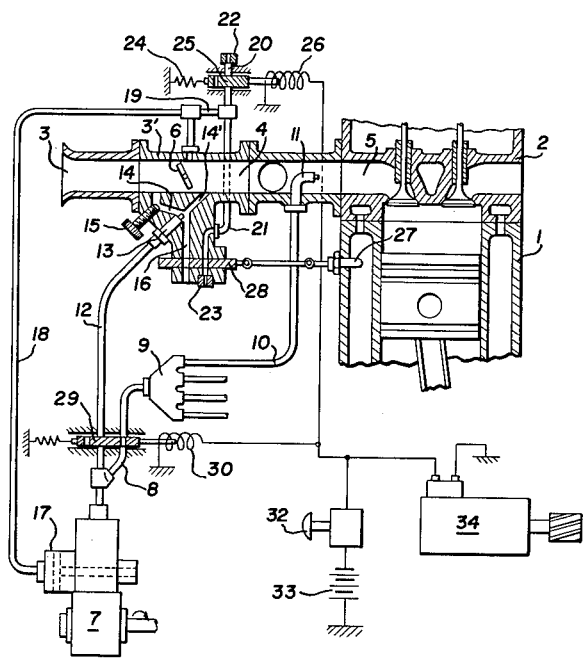
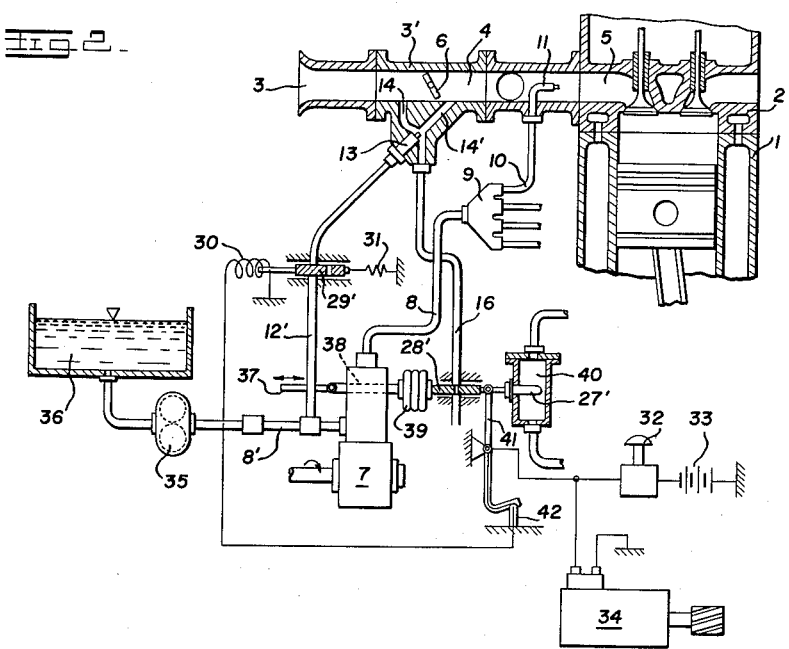
INVENTORS
KARL-HEINZ R. GÖSCHEL
HEINZ LAMM
BY
Dicke, Craig and Freudenberg
ATTORNEYS – # United States Patent Office 3,020,905
Patented Feb. 13, 1962

3,020,905
FUEL INJECTION SYSTEM
Karl-Heinz R. Göschel, Stuttgart-Unterturkheim, and Heinz Lamm, Stuttgart-Bad Cannstatt, Germany, assignors to Daimler-Benz Aktiengesellschaft, Stuttgart-Unterturkheim, Germany
Filed Sept. 8, 1959, Ser. No. 838,502
Claims priority, application Germany Sept. 13, 1958
27 Claims. (Cl. 123—179)

The present invention relates to a fuel injection system for a mixture-compressing internal combustion engine provided with a common intake manifold branching off into individual intake manifolds or ducts and with injection into the individual intake manifolds or ducts as well as with an uncontrolled branching, i.e., with a branching devoid of any control means, of the section of the main fuel supply line disposed to the rear of the injection pump and leading to the individual intake manifolds or ducts.

Such installations are relatively simple, however, they entail the disadvantage that with relatively slight injection pressures and injection quantities, i.e., especially with the relatively low, rotational speeds during starting, the distribution of the fuel quantity to the individual nozzles coordinated to the respective individual cylinders might become uneven, and more particularly in such a manner that one or the other nozzle does no longer operate at all effectively to inject any fuel. This, however, may give rise to operational troubles and disturbances, especially as under these circumstances it is quite possible that the internal combustion engine may not turn over and start for these reasons.

It is proposed in accordance with the present invention for purposes of avoiding these disadvantages to provide an auxiliary fuel line which branches off the main fuel line ahead of the branching point thereof leading to the various individual fuel supply lines and which operatively connects the main fuel supply line with the common intake manifold. The fuel injected through this auxiliary fuel line mixes with the air in the common intake duct or manifold and thereby reaches the individual intake ducts or manifolds and the respective cylinders. Even if the fuel injection into one or the other individual intake duct or manifold coordinated to a corresponding cylinder were to become inoperative, this cylinder, nonetheless, would receive a predetermined quantity of fuel derived from the auxiliary fuel line which is so chosen and metered that the operation of the engine can be maintained or the starting of the engine is still made possible.

The fuel injection system according to the present invention may be further refined by providing a closure or shut-off means in the auxiliary fuel line, in the form of any suitable valve or closure device. If such closure means is provided in the auxiliary fuel line, the quantity of fuel injected through this auxiliary fuel line may be chosen relatively very large therewith reliably assuring, for example, an unobjectionable and completely satisfactory starting of the internal combustion engine with certainty even during failure of an individual nozzle without causing an injection of such relatively large fuel quantity during normal operation of the internal combustion engine and without requiring a reduction of the fuel quantity normally injected through the individual nozzles which would have to be correspondingly reduced otherwise. The arrangement in accordance with the present invention may thereby be so made that the closure or shut-off device is automatically opened only during the starting period of the internal combustion engine during which the closure device is retained electromagnetically in the opened position thereof, for example, by actuation of the starter switch for the electric starter motor. In connection therewith, it is also recommendable to increase correspondingly the quantity of fuel supplied by the injection pump.

In particular, the fuel injection system and installation in accordance with the present invention may be so constructed that the auxiliary fuel line branches off from the main fuel line behind the injection pump and the closure device for the auxiliary fuel line is operatively connected with a closure device arranged in the main fuel line behind the point at which the auxiliary fuel line branches off in such a manner that one closure device is effectively in the closing position while the other one is in the opening position thereof thereby opening up the corresponding passage.

According to another constructional embodiment of the present invention, the fuel injection system essentially consists, in connection with those installations in which the fuel is supplied to the injection pump under pressure preferably produced by a fuel supply pump, in branching off the auxiliary fuel line ahead of the injection pump from the section of the main fuel supply line which is under pressure produced by the fuel supply pump. In such an installation, it is unnecessary during starting to adjust the adjustable control member or control rack of the injection pump to a position producing an increased fuel quantity since the additional fuel quantity necessary for starting is branched off or taken off the main fuel supply line already ahead of the injection pump and is predetermined at all times by the calibration of the nozzle of the auxiliary fuel line.

It is further proposed in accordance with the present invention as regards the manner of admixture of the fuel quantity injected through the auxiliary fuel line to the combustion air that a nozzle arranged at the end of the auxiliary fuel line injects the fuel into an idling-air line bypassing the main control throttle valve, preferably in the longitudinal direction of the corresponding section of the idling-air bypass line. In that manner, the fuel is mixed well with the air flowing through the idling-air bypass line without precipitating excessively along the walls of the duct or line. A particularly good mixing of the fuel with the air results from an arrangement in which the idling-air line and an auxiliary air-supply line supplying the necessary additional quantity of air for operation of the relatively cold internal combustion engine come together or intersect at the nozzle orifice preferably under the same acute angle with respect to the longitudinal axis of the auxiliary fuel jet, and adjoining the same a further common duct or line is provided in the direction of the longitudinal axis of the auxiliary fuel jet which leads to the common intake manifold. The aforementioned supply of additional air necessitated with a relatively cold internal combustion engine is controlled appropriately by a thermostat responsive to the thermal conditions of the internal combustion engine which, simultaneously therewith, also adjustably controls the control member or control rack of the fuel injection pump to provide the additional fuel quantity necessary in connection with the additional air supplied through the auxiliary air-supply line.

It is further desirable, independently of this last-mentioned increase of the fuel quantity, in installations in which the auxiliary fuel line branches off behind the injection pump, to provide during injection through the auxiliary fuel line a correspondingly increased fuel quantity. In order to realize this dependency and interrelationship, it is proposed in accordance with the present invention with fuel injection systems in which the injection quantity is automatically adjusted in an inversely proportional manner in relation to the magnitude of the vacuum and underpressure in the intake manifold that the control line effectively applying the vacuum or underpressure prevailing in the intake manifold to the control member or control rack of the injection quantity be provided with two controllable connections both leading to the atmosphere of which one is opened during energization of the starter motor and the other through a thermostat responsive to the thermal conditions of the internal combustion engine which thermostat also controls simultaneously the additional air supply necessary with a relatively cold internal combustion engine.

In the application of the present invention to fuel injection installations in which a thermostat responsive to the temperature conditions of the internal combustion engine, for example, a thermostat acted upon by the cooling water adjusts the fuel quantity and additional air supply, it is proposed in accordance with the present invention that the same thermostat actuates a switch interconnected in an electric circuit operative to open by electromagnetic means the closure or shut-off means in the auxiliary fuel line during actuation of the electric starter motor in such a manner that after exceeding predetermined engine temperature the electric circuit into which the switch is connected is opened automatically by the thermostat.

Accordingly, it is an object of the present invention to provide a fuel injection system which obivates the disadvantages encountered in the prior art systems.

It is another object of the present invention to provide a fuel injection system which compensates for possible operational failures, especially during starting of the engine, with a fuel injection system in which fuel is injected through individual nozzles coordinated to respective cylinders.

Still another object of the present invention is to provide an auxiliary fuel injection arrangement which assures a sufficient amount of fuel to the individual cylinders even though the individual fuel injection systems individually coordinated to the respective cylinders may become inoperative, for example, by reason of the relatively low rotational speeds of the engine especially during starting thereof.

Still another object of the present invention is the provision of an automatic control system for automatically controlling the fuel quantity and combustion air supply in such manner as to assure a sufficient quantity of combustible mixture under all operating conditions to thereby guarantee proper operation of the engine at all times.

A further object of the present invention resides in the provision of a control system automatically adjusting the amount of fuel injected into the common intake manifold under certain operating conditions while at the same time appropriately adjusting also the supply of idling-air with which the fuel injected into the common manifold is mixed so as to assure thereby a sufficient amount of combustible mixture for each cylinder notwithstanding inadequate injection through the individual injection nozzles.

These and other objects, features and advantages of the present invention will become more obvious from the following description when taken in connection with the accompanying drawing, which shows, for purposes of illustration only, two embodiments in accordance with the present invention, and wherein:

FIGURE 1 is a partial cross-sectional view through an internal combustion engine and a schematic diagram of the control system in accordance with the present invention operatively connected with the internal combustion engine; and FIGURE 2 is a partial cross-sectional view through an internal combustion engine and a modified embodiment of a control system in accordance with the present invention operatively connected therewith.

Referring now to the drawing wherein like reference numerals are used throughout the two views to designate like parts, reference numeral 1 designates the cylinder block and reference numeral 2 the cylinder head of any conventional internal combustion engine. The internal combustion engine illustrated in the two views may be provided with a cylinder block having several in line cylinders. However, it is also underestood that the present invention is applicable to any other arrangement of the cylinders, for example, to a V-type internal combustion engine or the like.

A common intake manifold extends from the outer end 3 exposed to the atmosphere to the inner end 4 thereof and branches off at the inner end 4 into a plurality of individual intake ducts or manifolds of which only one intake duct 5 is illustrated fully in the drawing which leads to the corresponding cylinder. The other individual intake ducts lead from the inner end 4 of the common intake manifold to the other cylinders so that each cylinder is individually supplied with combustion air or with combustible air-fuel mixture, as the case may be. The section 3' provided with the conventional main throttle valve 6 forms a part of the common intake manifold 3—4.

The fuel injection pump 7 of any suitable construction having an adjusting control rack or the like is of the type provided with only a single pressure space from which, in the embodiment illustrated in FIGURE 1, a main fuel line 8 leads to a distribution point 9. The distribution point 9 is of the non-controlled type so that fuel flowing through the main fuel supply line 8 is permitted to flow freely at all times in essentially equal amounts into the various individual branch lines 10. The actual construction of the distribution point 9 may thereby be of any known, suitable type to assure proper operation of the fuel injection system for its intended purposes under normal operating conditions. Individual fuel branch lines 10 thereby lead from the distribution point 9 to the individual nozzles 11 of which one each is located in an individual branch intake duct 5 and supplies a respective cylinder with injected fuel which is injected into the corresponding individual branch intake duct 5. An auxiliary fuel line 12 branches off from the main fuel line 8 ahead of the distribution point 9 whereby an injection nozzle 13 is arranged at the end of the auxiliary fuel line 12. The nozzle 13 injects fuel into an idling-air channel or duct 14, 14' bypassing the throttle valve 6 whereby the free cross section of the idling-air bypass channel 14, 14' is adjustable by means of an idling-speed adjusting screw 15. An additional auxiliary air-supply line 16 also terminates near the orifice of the injection nozzle 13. It should be noted that the nozzle 13 thereby injects fuel in a direction essentially coaxially to the direction of the bypass air duct section 14' which effectively combines the bypass duct section 14 and the auxiliary air duct 16 both of which preferably subtend the same acute angle with respect to the axis of the fuel injection nozzle 13.

The control of the fuel injection quantity takes place by means of a vacuum-responsive control or regulating device 17 attached or built into the fuel injection pump 7 which is operatively connected or is in communication through a control line 18 with a point in the section 3' of the common intake manifold 3—4 disposed closely behind the main throttle 6 thereof. A line 19 also terminates in the control line 18 which may be brought into communication with the atmosphere through two additional auxiliary lines 20 and 21. The free effective cross sections of lines 20 and 21 are predetermined by accurately calibrated nozzles 22 and 23 inserted, for example, at the free ends thereof. Nozzles 22 and 23 may be of any suitable construction and may possibly be of the type readily interchangeable or reliably adjustable. The line 20 is adapted to be blocked or closed off by a slide valve member 25 which is adjusted to its normally closed position by the spring 24. However, the control slide valve member 25 may be pulled against the force of spring 24 by means of an electromagnet 26 into such a position thereof that the line 20 is thereby opened.

A thermostat 27 sensing the thermal conditions of the internal combustion engine, for example, by being arranged in the cooling water jacket of the cylinder block 1 is operative to displace a slide valve member 28 which, in one position thereof, keeps lines 16 and 21 open whereas in the other position thereof, the slide member 28 closes these lines 16 and 21. The line 12 as a rule during normal operation is kept closed by the slide valve member 29 which, at the same time, during normal operation opens up the line 8. However, the slide valve member 29 may also be selectively brought into a position thereof with the aid of an electromagnet 30 against the force exerted thereon by spring 31 normally seeking to displace the slide valve member 29 toward the left as viewed in FIGURE 1, in which the line 12 is opened and the line 8 is closed. The electromagnets 26 and 30 are operatively connected with the battery 33 through the starter switch 32 which may be of any suitable construction. Furthermore, the switch 32 also is adapted to close the circuit for the energization and therewith for the actuation of the electric starter motor 34.

The parts and elements illustrated schematically in FIGURE 1 and also in FIGURE 2 may be of any conventional construction. This is true of the fuel injection pump 7 and its automatic regulating device 17, as well as its selective control mechanism illustrated only schematically as control rack, of the starter switch 32, of the starter motor 34 and of the electromagnets 26 and 30. Additionally, the thermostat 27 may be of any suitable construction and may be located in any suitable place in which the relative thermal condition of the internal combustion engine may be sensed. Instead of being placed into the cooling jacket to respond to the cooling water the thermostat 27 or 27' may also be placed into the oil circulatory system of the lubrication system since the lubricant used thereon normally reflects the thermal conditions of the engine. On the other hand, it is also possible to locate the thermostat 27 or 27' in the cooling air stream, for instance, with an air-cooled internal combustion engine. Furthermore, the thermostat 27 may also be mounted and operatively connected with the cylinder block or head of the engine in those places in which the temperature of the block or head accurately reflects the relative thermal condition of the internal combustion engine.

*Operation*

The operation of the internal combustion engine and control system illustrated in FIGURE 1 is as follows:

The various parts and control elements illustrated in FIGURE 1 are in the respective positions thereof in which the installation finds itself prior to starting a relatively cold internal combustion engine.

Upon actuation of the starter button or starter switch 32, the starter motor 34 is set into rotation while at the same time the slide valve members 25 and 29 are pulled toward the right by attraction of their magnetic armatures as a result of energization of the control windings of electromagnets 26 and 30. The control valve member 6 is in the closed position thereof and the internal combustion engine receives combustion air through the idling-air bypass line 14, 14' and through the auxiliary air supply line 16. The vacuum-responsive regulating device 17 adjusts the injection pump 7 automatically to a relatively very large fuel quantity since the vacuum or underpressure caused by the closure of the throttle valve 6 which normally would prevail in the control line 18 is far reachingly compensated for by the air supplied through lines 20 and 21, the former being opened upon energization of the control magnet 26 and the latter being opened by the thermostat 27 due to the relatively low temperature of the cooling water. In other words, opening of lines 20 and 21 in effect applies to the vacuum responsive automatic regulating mechanism 17 of the fuel injection pump 7 an effective control magnitude which does not correspond to the actual vacuum condition that would normally prevail in the intake manifold behind the control valve 6 but in effect is compensated by the admission of air through lines 20 and 21 so as to produce a much larger fuel injection quantity.

Energization of winding 30 displaces slide valve member 29 toward the right thereby closing the main fuel supply line 8 and opening the auxiliary fuel supply line 12. Consequently, fuel is injected through the auxiliary fuel line 12, whereby the total quantity of injected fuel takes into consideration the additional amount of air supplied through auxiliary air supply line 16 as well as the particularly large amount of fuel required during starting. As soon as the starter button 32 is released, electromagnets 26 and 29 are again de-energized and the slide valve members 25 and 29 return to the positions thereof illustrated in FIGURE 1 so that now the injection of the fuel, after the internal combustion engine turns over and runs, takes place only through the re-opened main fuel supply line 8 by means of the individual nozzles 11, as is desirable in principle. As a result of closure of line 20 through the slide valve member 25 after de-energization of relay 26, the amount of fuel quantity supplied by the fuel injection pump 7 which heretofore had been adjusted by the regulating device 17 to a relatively large amount is again reduced since a large absolute vacuum now becomes effective at the regulator 17 through line 18. As soon as the engine warms up to normal temperature, the slide valve member 28 is displaced by the thermostat 27 toward the right as viewed in FIGURE 1 and thereby closes both lines 16 and 21. As a result of this movement of the slide valve member 28, the additional air supplied through auxiliary air supply line 16 is cut-off and, at the same time, the amount of the fuel quantity supplied by the injection pump 7 is further reduced by reason of a fact that the actual pressure normally prevailing in the common intake manifold at the place just behind the control valve 6 is now the sole control magnitude operative to adjust the fuel injection pump 7, namely, to a lesser quantity of fuel injection. The internal combustion engine now operates under normal idling condition.

The installation illustrated in the embodiment of FIGURE 2 is constructed in a similar manner as FIGURE 1 insofar as the suction or intake manifolds 3, 3', 4 and 5, the injection into the individual intake ducts or lines by means of nozzles 11, and the air channels or ducts 14, 14' and 16 are concerned into which the nozzle 13 placed at the end of the auxiliary fuel line 12' injects the fuel. However, FIGURE 2 is different from FIGURE 1 by branching off the auixiliary fuel supply line 12' from the main fuel line section 8' upstream from or ahead of the injection pump 7. The section 8' of the main fuel line disposed ahead of the injection pump 7 is normally under pressure by reason of the presence of a fuel supply pump 35 of any suitable construction which supplies the fuel, for example, at a pressure of 0.8 atmosphere. The pump 35 thereby supplies fuel from tank 36 at that or any other suitable pressure to the injection pump 7 through the main fuel supply line. The injection pump 7 is appropriately adjusted in any suitable manner not illustrated in detail herein, for example, mechanically by a control linkage 37 as is well known. Since such adjustment mechanisms for fuel injection pumps are well known in the art, a further description and detailed showing thereof is dispensed with herein. The control member or control rack 38 of the injection pump 7 may also be influenced in its position by means of a control slide valve member 28' constructed as an abutment or stop by the interposition of an elastic member 39 which may be constructed, for example, as a barometric cell responsive to atmospheric pressure. The control slide valve member 28' serves for purposes of controlling the auxiliary air supply line 16 and is actuated by a thermostat 27 which responds to the thermal conditions of the engine and which may be located in any suitable place for that purpose, for example, in a housing 40 through which the cooling water of the engine cooling system flows. However, the thermostat 27' may also be arranged in any other suitable manner as mentioned hereinabove in connection with the thermostat 27.

The thermostat 27' additionally actuates a two-armed lever 41, the lower end of which slides along a contact member 42. The electric circuit includes battery 33, starter switch 32 and electromagnetic relay 30 thereby includes in series the two-armed lever 41 and contact piece 42 thereby effectively controlling the electromagnet 30 by movement of two-armed lever 41 so that the control slide valve member 29' for the auxiliary fuel line 12' is displaced toward the left as viewed in FIGURE 2 against the force exerted thereon by spring 31 upon energization of relay 30.

*Operation*

The operation of the fuel injection system in accordance with the present invention illustrated in FIGURE 2 is as follows:

The various parts illustrated in FIGURE 2 are again shown in the respective positions thereof which they assume with a relatively cold engine just prior to starting. Upon actuation of the starter button 32, the starter motor 34 is set into rotation. Simultaneously therewih, current flowing through the closed circuit including the two-armed lever 41 and contact piece 42 is permitted to energize the winding of the electromagnet 30 whereby energization of the electromagnetic relay 30 opens the auxiliary fuel line 12' by attracting the armature secured to the control slide valve member 29' toward the left as viewed in FIGURE 2. The additional quantity of fuel supplied to the common intake manifold 3—4 through the additional fuel line 12', however, would be harmful if the internal combustion engine had already reached a sufficiently warm operating condition. However, this cannot happen since in that case, the thermostat 27' would have already adjusted the two-armed lever 41 in the clockwise direction to such an extent that no contact would exist any longer with contact piece 42. By opening the contact at 42, the auxiliary fuel line 12' could not be opened even if the starter button 32 is depressed since no closed energizing circuit would exist any longer to energize the electromagnetic relay 30. Furthermore, in that case the auxiliary air line 16 has also been closed by slide valve 28' as no additional air would be necessary any longer for proper operation and driving with a relatively warm engine, i.e., with a relatively thin lubricant. Moreover, the slide valve member 28' would have moved toward the right as viewed in FIGURE 2, thereby no longer abutting against the barometric cell 39 so that the previous adjustment of the injection pump 7 which would have corresponded to the additional fuel quantity required by the corresponding amount of additional air supplied through auxiliary air supply line 16 no longer obtains.

While we have shown and described two embodiments in accordance with the present invention, it is understood that the same is not limited thereto but is susceptible of many changes and modifications within the spirit and scope of the present invention, and we, therefore, do not wish to be limited to the details described and shown herein but intend to cover all such modifications and changes as are encompassed by the scope of the appended claims.

We claim:

1. A fuel injection system for a mixture-compressing internal combustion engine having a plurality of cylinders comprising common intake means for drawing in combustion air, individual intake ducts branching off from said common intake means and leading from said common intake means to the individual cylinders of the engine, main fuel supply means including fuel injection means and individual fuel lines leading to the individual intake ducts for supplying fuel to said individual intake ducts, and auxiliary fuel supply means operatively connecting said main fuel supply means with said common intake means for supplying a predetermined quantity of fuel to said common intake means, means to maintain said main fuel supply means normally closed during starting of the engine, and means to maintain said auxiliary fuel supply means normally open during starting.

2. A fuel injection system according to claim 1, wherein said auxiliary fuel supply means includes an auxiliary fuel line provided with closure means.

3. A fuel injection system according to claim 2, further comprising means for automatically opening said closure means only during starting of the engine.

4. A fuel injection system for a mixture-compressing internal combustion engine having a plurality of cylinders, comprising common intake means, individual intake ducts branching off from said common intake means and leading from said common intake means to the individual cylinders of the engine, fuel supply means, individual fuel injection means for individually injecting fuel into said individual intake ducts, individual fuel lines operatively connecting said fuel supply means with said individual fuel injection means, and auxiliary fuel supply means operatively connecting said first-mentioned fuel supply means with said common intake means for selectively supplying a predetermined quantity of fuel into said common intake means, means to maintain said main fuel supply means normally closed during starting of the engine, and means to maintain said auxiliary fuel supply means normally open during starting.

5. A fuel injection system according to claim 4, further comprising an electric starting motor, said auxiliary fuel supply means including selectively operable shut-off means, and starter means for said electric starter motor including means for automatically electromagnetically opening said shut-off means during actuation of said starter means.

6. A fuel injection system according to claim 5, wherein said fuel supply means includes means for automatically increasing the amount of fuel supplied by said fuel injection pump means with said shut-off means opened.

7. A fuel injection system for a mixture-compressing internal combustion engine having a plurality of cylinders, comprising common intake means, individual intake ducts branching off and leading from said common intake means to the individual cylinders of the engine, fuel injection means including a main fuel line, injection pump means in said main fuel line, individual fuel lines branching off said main fuel line and leading to the individual intake ducts, and auxiliary fuel supply means operatively connecting the main fuel line with said common intake means for supplying a predetermined quantity of fuel to said common intake means.

8. A fuel injection system according to claim 7, wherein said auxiliary fuel supply means includes means for selectively rendering the same effective, and means for automatically increasing the quantity of fuel supplied by said injection means in response to the actuation of said last-mentioned means to render the same effective.

9. A fuel injection system for a mixture-compressing internal combustion engine having a plurality of cylinders, comprising common intake means, individual intake ducts branching off and leading from said common intake means to the individual cylinders of the engine, main fuel supply means including fuel injection pump means, a plurality of individual fuel lines leading to the respective individual intake ducts, distribution means operatively connecting said main fuel supply means with said individual fuel lines, and auxiliary fuel supply means operatively connecting said main fuel supply means with said common intake means for selectively supplying a predetermined quantity of fuel to said common intake means including selectively operable closure means for selectively rendering said auxiliary fuel supply means effective and ineffective.

10. A fuel injection system according to claim 9, wherein said auxiliary fuel supply means includes an auxiliary fuel line branching off from said main fuel supply means upstream of said fuel injection pump means.

11. A fuel injection system according to claim 10, wherein said closure means includes valve means in said main fuel supply means located at a point downstream of the branching off of said auxiliary fuel line from said main fuel supply means and another valve means in said auxiliary fuel supply line, and means operatively connecting said valve means with each other so as to open one of said valve means while closing the other and vice versa.

12. A fuel injection system according to claim 7, wherein said fuel injection means includes fuel supply pump means for supplying fuel under pressure to said fuel injection pump means, and wherein said auxiliary fuel supply means includes an auxiliary fuel line branching off from the main fuel line within the section thereof intermediate said injection pump means and said fuel supply pump means.

13. A fuel injection system for a mixture-compressing internal combustion engine having a plurality of cylinders comprising common intake means for drawing in combustion air, said common intake means including a main throttle valve and an idling air by-pass line effectively by-passing said throttle valve, individual intake ducts branching off from said common intake means and leading from said common intake means to the individual cylinders of the engine, main fuel supply means including individual fuel lines leading to the individual intake ducts for supplying fuel to said individual intake ducts, and auxiliary fuel supply means operatively connecting said main fuel supply means with said common intake means for supplying a predetermined quantity of fuel to said common intake means, said auxiliary fuel supply means including an auxiliary fuel supply line terminating in a nozzle discharging into said by-pass line.

14. A fuel injection system according to claim 13, wherein said by-pass line includes a line section extending essentially in the direction of the axis of said fuel injection nozzle and wherein said fuel injection nozzle injects the fuel into said by-pass line section essentially in the line of its axis.

15. A fuel injection system for a mixture-compressing internal combustion engine having a plurality of cylinders comprising common intake means for drawing in combustion air, said common intake means including a main throttle valve means, a by-pass line having a first section and a second section connected in series with each other and effectively by-passing said throttle valve means, individual intake ducts branching off from said common intake means and leading from said common intake means to the individual cylinders of the engine, main fuel supply means including individual fuel lines leading to the individual intake ducts for supplying fuel to said individual intake ducts, and auxiliary fuel supply means operatively connecting said main fuel supply means with said common intake means for supplying a predetermined quantity of fuel to said common intake means, said auxiliary fuel supply means including means for injecting fuel into said second section of said by-pass line, and an auxiliary air supply line for supplying additional air to said second section of said by-pass line with said engine in relatively cold operating conditions.

16. A fuel injection system according to claim 15, wherein said further auxiliary air supply line and said first section of said by-pass line form essentially the same acute angle with the axis of said second section of said by-pass line, said further auxiliary air supply line joining said second section of said by-pass line substantially at the point of juncture of said first section with said second section.

17. A fuel injection system according to claim 15, further comprising means for automatically adjusting the amount of fuel injected by said injection pump means inversely proportional to the vacuum in said common intake means including regulating means operatively connected with said fuel injection pump means, a control line operatively connecting said common intake means with said regulator means, and two separately controllable means in operative connection with said control line for admitting air from the atmosphere to said control line during actuation of the starter means for said engine by one of said separately controllable means and in response to the thermal condition of said engine by said other separately controllable means.

18. A fuel injection system according to claim 17, wherein said other separately controllable means includes thermostat means simultaneously controlling also the supply of air through said further auxiliary air supply line.

19. A fuel injection system according to claim 15, further comprising thermostat means responsive to the thermal condition of the engine for adjustably controlling the amount of fuel injected by said fuel injection pump means and the supply of additional air through said auxiliary air supply line, electromagnetically controlled closure means for selectively opening and closing said auxiliary fuel supply means including an electromagnet, an electric circuit for supplying energizing current for said electromagnet, and a switch for selectively opening and closing said circuit, said switch being operatively connected with said thermostat means so as to open said switch upon exceeding a predetermined engine temperature within said engine.

20. A fuel injection system for a mixture-compressing internal combustion engine having a plurality of cylinders, comprising common intake means, individual intake ducts branching off from said common intake means and leading from said common intake means to the individual cylinders of the engine, main fuel supply means including fuel injection pump means, a plurality of individual fuel lines each provided with fuel injection nozzle means and leading to the respective individual intake ducts, distribution means operatively connecting said individual fuel lines with said main fuel supply means, and auxiliary fuel supply means operatively connecting said main fuel supply means with said common intake means for selectively supply a predetermined quantity of fuel to said common intake means.

21. A fuel injection system according to claim 20, wherein said auxiliary fuel supply means includes an auxiliary fuel line and selectively operable closure means for said auxiliary fuel line, said auxiliary fuel line branching off from said main fuel supply means to the rear of said fuel injection pump means, said main fuel supply means including closure valve means disposed in the section of said fuel supply means intermediate said distribution means and the point where the auxiliary fuel supply line branches off from said main fuel supply means, and means operatively connecting said closure means in such a manner that one closure means is open while the other is closed and vice versa.

22. A fuel injection system according to claim 20, wherein said main fuel supply means includes a fuel supply pump supplying the fuel under predetermined pressure to said fuel injection pump means, and wherein said auxiliary fuel supply means is branched off from said main fuel supply means in the section thereof intermediate said fuel supply pump means and said fuel injection pump means.

23. A fuel injection system according to claim 20, further comprising main throttle valve means in said common intake means, a by-pass air line by-passing said main throttle valve means, and wherein said auxiliary fuel supply means includes a line with an injection nozzle at the end thereof injecting the fuel into a section of said by-pass line, said last-mentioned section being disposed essentially coaxially with said fuel injection nozzle.

24. A fuel injection system according to claim 20, wherein said common intake means is provided with a main throttle valve, a by-pass air line effectively by-passing said main throttle valve and including a first section adjoined by a second section subtending an angle with said first section, said auxiliary fuel supply means including an auxiliary fuel line provided with injection nozzle means at the end thereof with the axis of said injection nozzle means extending substantially in the same direction as said second section of said by-pass line, a further auxiliary air supply line terminating in said by-pass line essentially at a point intermediate said first and second section to supply said additional combustion air to said second section with the engine in relatively cold condition, said first section and said auxiliary air supply line subtending approximately the same angle with the axis of said injection nozzle means.

25. A fuel injection system according to claim 24, wherein said fuel injection pump means includes vacuum-responsive regulating means for adjustably regulating the amount of fuel supplied by said injection pump means, a control line operatively connecting said common intake means at a point to the rear of said control valve means with said regulating means, two auxiliary control lines exposed at one end thereof to the atmosphere and connected at the other end thereof with said control line, means for opening one of said auxiliary control lines only during starting of said engine, and means for closing the other of said auxiliary control lines with said engine exceeding a predetermined temperature.

26. A fuel injection system according to claim 20, wherein said fuel injection pump means includes regulating means for adjustably regulating the amount of fuel injected thereby, a main throttle valve in said common intake means, a by-pass air line by-passing said throttle valve, said auxiliary fuel supply means including an auxiliary fuel line with a nozzle at the end thereof for injecting the fuel supplied therethrough into a portion of said by-pass line, an auxiliary air supply line for supplying additional quantities of combustion air to said portion of the by-pass line with the engine in a relatively cold position, an electric starter motor for said engine, an electric energizing circuit including a switch for said starter motor and thermostat means responsive to the thermal condition of said engine operatively connected with said regulating means and with said auxiliary air supply line as well as with said switch for effectively reducing the amount of fuel supplied by said injection pump means and for closing off said auxiliary air supply line with said engine exceeding a predetermined temperature while at the same time opening said switch to thereby prevent energization of the circuit portion connected with said switch, and electromagnetically controlled means operatively connected in said circuit portion and operative to enable opening of said auxiliary fuel line only upon closure of said switch.

27. A fuel injection system according to claim 26, further comprising pressure responsive means responsive to the atmospheric pressure intermediate said thermostat means and said regulating means.

References Cited in the file of this patent

UNITED STATES PATENTS

| | | |
|---|---|---|
| 1,625,007 | Weeber | Apr. 19, 1927 |
| 1,799,397 | Taylor et al. | Apr. 7, 1931 |
| 2,664,872 | Ericson et al. | Jan. 5, 1954 |